(12) United States Patent
Trescher et al.

(10) Patent No.: US 9,117,070 B2
(45) Date of Patent: Aug. 25, 2015

(54) METHOD FOR ADAPTING AND EXECUTING A COMPUTER PROGRAM AND COMPUTER ARCHITECTURE THEREFORE

(75) Inventors: Joachim Artur Trescher, Waalre (NL); Paulus Mathias Hubertus Mechtildis Gorissen, Eindhoven (NL); Wilhelmus Petrus Adrianus Johannus Michiels, Reusel (NL)

(73) Assignee: NXP, B.V., Eindhoven (NL)

( * ) Notice: Subject to any disclaimer, the term of this patent is extended or adjusted under 35 U.S.C. 154(b) by 982 days.

(21) Appl. No.: 12/995,422

(22) PCT Filed: May 12, 2009

(86) PCT No.: PCT/IB2009/051946
§ 371 (c)(1),
(2), (4) Date: Nov. 30, 2010

(87) PCT Pub. No.: WO2009/144606
PCT Pub. Date: Dec. 3, 2009

(65) Prior Publication Data
US 2011/0078420 A1    Mar. 31, 2011

(30) Foreign Application Priority Data
May 30, 2008   (EP) .................................... 08104191

(51) Int. Cl.
*G06F 21/52* (2013.01)
*G06F 21/77* (2013.01)

(52) U.S. Cl.
CPC ................ *G06F 21/52* (2013.01); *G06F 21/77* (2013.01)

(58) Field of Classification Search
None
See application file for complete search history.

(56) References Cited

U.S. PATENT DOCUMENTS

| 2005/0183072 A1 | 8/2005 | Horning et al. |
| 2005/0257033 A1 | 11/2005 | Elias et al. |
| 2007/0250703 A1 | 10/2007 | Giraud et al. |
| 2008/0040593 A1 | 2/2008 | Kaabouch et al. |

FOREIGN PATENT DOCUMENTS

| CN | 101162491 A | 4/2008 |
| JP | 2000357110 A | 12/2000 |
| WO | 2007077142 A2 | 7/2007 |

OTHER PUBLICATIONS

Lie, David, et al; "Specifying and Verifying Hardware for Tamper-Resistant Software"; Proceedings of the 2003 IEEE Symp on Security and Privacy; Berkely, CA, US; pp. 166-177; (May 11, 2003).
Boneh, et al; "On the Imporatance of Checking Cryptographic Protocols for Faults"; Lecutre Notes in Computer Science, vol. 1233; pp. 37-51 (1997).
International Search Report for Application PCT/IB2009/051946 (Jun. 29, 2009).

*Primary Examiner* — Corey S Faherty

(57) ABSTRACT

A computer architecture (100) and a method for adapting and executing (200) a computer program therefore, is provided. A value is computed by processing the instructions comprised in a basic block of the program in accordance with a first mathematical function (208). An instruction comprising an original address is modified, using a second mathematical function (214) taking the value as input, to comprise a modified address. In this manner, a fault attack during execution of the computer program will cause a disturbance of the control flow, thereby making such an attack unlikely to succeed.

17 Claims, 6 Drawing Sheets

| 601 | 602 | 603 |
|---|---|---|
|  |  | 0xaaaaffff |
| 1 | CMP A,B | 0x3b538d9e |
| 2 | AND C,D | 0xab371234 |
| 3 | JMP 0xab371232 |  |

604:    0xab371232 + 0xab371234 = 0x00000006

| 601 | 602 | 603 |
|---|---|---|
| | | 0xaaaaffff |
| 1 | CMP A,B | 0x3b538d9e |
| 2 | AND C,D | 0xab371234 |
| 3 | JMP 0xab371232 | |

604: 0xab371232 + 0xab371234 = 0x00000006

Fig. 6

METHOD FOR ADAPTING AND EXECUTING A COMPUTER PROGRAM AND COMPUTER ARCHITECTURE THEREFORE

FIELD OF THE INVENTION

The invention relates to a method of executing a computer program.

The invention also relates to a computer architecture.
The invention also relates to a device.
The invention also relates to computer program product.
The invention also relates to a further method for adapting a computer program.
The invention also relates to a further computer program product.

BACKGROUND OF THE INVENTION

Fault attacks can, e.g., be used, e.g., to compromise the security and integrity of data handling systems, such as computer products. In particular, fault attacks are an area of concern for smart cards. A fault attack introduces a fault into the system during its operation, thereby causing the system to deviate from its programmed operation. In the past, fault attacks were commonly glitch attacks, such as induced on a power line or a reset line. More recently, light attacks have been found to be a relatively easy way of introducing a fault and disturbing the program flow of a microcontroller. A light attack is executed by flashing light on a surface of, e.g., an integrated circuit (IC), typically while the IC is operating.

Fault attacks are typically targeted to commands, such as conditional jumps or the test instructions preceding them. For example, fault attacks can be used to circumvent a verification of a personal identification number (PIN) number in a smart card. If a user enters an incorrect PIN number, he/she can execute a fault attack at the moment the program is about to jump away to a routine for handling wrong PIN numbers. As a result of the fault attack the jump to the routine for handling wrong PIN numbers is not executed and the program continues as if the PIN number was correct. In this case the user gains, through the fault attack, the privileges associated with a correct PIN number, even though he/she only has possession of a wrong PIN number.

Other classes of security attacks that use fault attacks are those on cryptographic algorithms, such as used in, e.g., cryptographic protocols. For example, using the fault attack, an attacker can cause the algorithm to produce a wrong value. By analyzing the type of errors that occur in this manner, the attacker is, in some circumstances, able to deduce, e.g., a secret key. See, e.g., Boneh at al., "On the Importance of Checking Cryptographic Protocols for Faults", 1997, Lecture Notes in Computer Science, volume 1233, pages 37-51. The latter attack is also known as the Bellcore attack.

Light attacks affect a read access to a memory, both volatile, such as RAM and non-volatile memory, such as a Read Only Memory (ROM), an EEPROM or Flash-memory. Usually, it is not the memory cell's content which is changed by the light attack, but only the value that is read back which is momentarily changed.

One major security vulnerability on, for instance, smart cards, is the bus that takes care of the communication of a processor with off-chip peripherals and resources, such as code- and data-memory. It is possible to carry out a physical attack in which the values of the bus lines are tampered. To illustrate the power of such an attack, consider the scenario, wherein the value of the program counter (PC), which is put on the bus to the memory in order to retrieve the next instruction of a program that is executed, is changed By only changing a single bit, the attacker can prohibit the execution of a possibly critical instruction, which instruction may be part of, or safeguarding, a security measure taken in the program.

Computer programs are usually structured as a set of basic blocks of instructions. A block of code that has precisely one entry point and one exit point, and which contains, between the entry point and the exit point no jump instructions, and no instructions which are the destination of a jump instruction, is a basic block. A jump instruction is a point in a computer program where the control flow can be altered using an address.

More formally, and somewhat more generally, a sequence of instructions forms a basic block if any instruction in any particular position in the sequence necessarily executes before any other instruction in the sequence, which other instruction is in a position after the particular position, and if moreover, no other instruction executes between two successive instructions in the sequence. Computer programs can be represented as a directed graph wherein the set of basic blocks form the nodes and jumps represent directed edges that connect basic blocks. This representation of a program is called a control-flow graph.

Note that a jump can be an unconditional jump or a conditional jump. For example, on the instruction set of an 8051 processor, the 'LJMP' instruction represents the 'Long Jump' instruction, which is a jump to an address that is unconditional. For example, also for the 8051 processor, the 'CJNE' instruction represents the 'Compare and Jump If Not Equal' instruction, which compares two operands and only jumps if the operands are equal.

SUMMARY OF THE INVENTION

Published patent application WO 2007/077142, 'PROCEDE DE SECURISATION DE L'EXECUTION D'UN PROGRAMME D'ORDINATEUR' discloses a method to detect some fault attacks that cause the execution of an instruction to be omitted. The method counts the number of neutral instructions in a basic block up to, but not including, the exit point of the basic block. At that point the counted number of neutral instructions is compared to a stored number of expected neutral instructions. If the counted number is not equal to the expected number an interruption is raised.

It is a problem of the prior art that fault attacks on a computer program can cause the computer program to perform unauthorized operations.

It is an object of the invention to mitigate or reduce the problem given above.

The object is achieved by the method of executing a computer program according to the invention. Herein the computer program comprises a first number of basic blocks and each respective one of the basic blocks comprises a respective second number of instructions.

The method according to the invention comprises the following steps: at the start of an execution of a specific one of the basic blocks: storing a start value in a register; at the time of an execution of a specific one of the instructions in the specific basic block: processing, in accordance with a first mathematical function, a first value currently contained in the register together with a representation of the specific instruction in order to derive an updated value; storing the updated value in the register; at the time of an execution of a further specific one of the instructions in the specific basic block, wherein the further specific instruction comprises an original address: deriving a modified address by processing, in accordance with a second mathematical function, the original address and a second value currently contained in the register; executing the further specific instruction using the modified address instead of the original address.

The method achieves the object since, if a fault attack modifies one of the instructions in the basic block, the second value will also be modified, as the second value depends through the first mathematical function on the instructions in the basic block. As a result, the original address will not be modified to the modified address, but to a wrong address, wherein the wrong modified address is different from the modified address. This is problematic for the attacker. Ideally an attacker wants to make controlled changes to a computer program. For example, the attacker may want to disable a test for authorization, but he would likely wish to avoid disturbing the operation for which authorization was needed. As a result of the invention, when the test for authorization is disturbed, e.g. by using a fault attack, subsequent instructions will use a wrong address, which means that most likely the operation that needs authorization will also be disturbed as result of the fault attack. Using the invention, fault attacks will result in haphazard operation of the computer program and may only per unlucky chance accident perform an operation that is of value to the attacker.

As a result of jumping to a wrong address, the control flow of the program is fundamentally disturbed. As the execution of a computer program calls for the accurate execution of instructions in a particular order, a disturbance of the control flow will likely cause the program to no longer perform its intended duty.

This disturbance is of no immediate use to an attacker, i.e. the disturbance cannot be exploited by him/her to gain an advantage, as the changes to the control flow are not under his/her direct control, but only through the intermediates of the first and second mathematical functions.

The method of executing a computer program according to the invention is best used on a computer program which was previously prepared using a further method according to the invention, in such a manner that a further specific instruction that includes an original address, which, after it has been processed with the second value by the second mathematical function, will give an address that results in a correct program flow.

Note that in one embodiment of the method, the method step of processing, in accordance with a first mathematical function, is also done for the further specific instruction.

In between the steps of the method other, possibly unrelated, steps can be performed. In particular, typically, the specific instruction will be executed.

Note that the original address can be an absolute address or a relative address. In case of a relative address, the original address is relative to the address at which the further specific instruction is stored in a memory, or it may be relative to a Program Counter. In case of an absolute address, the address can encode, for example, only within the current page in memory, or for a long address, to any place in the memory. An original address may correspond to a physical location in the memory, or to a virtual address.

A person skilled in the art can combine the method according to the invention with many types of addresses.

Note that, for the purpose of the method, basic blocks can be allowed in which only the first instruction is the target of a jump, only the last instruction is an unconditional jump, but wherein an instruction in between the first and the last instruction can be a conditional jump. What is important is that the conditional jump, jumps to the beginning of a basic block.

The start value may be a constant value. For example, the start value may be zero. The start value may also be any other number. The start value may be chosen differently for other hardware. For example, the starting value may be different for different batches of hardware. The starting value may also be a function depending on various parameters, and combinations thereof, such as: the address where the basic block starts, a number assigned to the basic block, etc.

This mechanism to detect evidence of tampering with instruction sequences and/or the control flow of an application can be used for all applications where an attacker might gain a benefit by changing the outcome of a computation. This may be the case in the area of applications that are used for identification or the protection of digital rights.

The method according to the invention may also be advantageously applied in other application areas, for example, in an application where code is transmitted through a noisy channel to a computing device. The presented invention can detect defects that are introduced through the transmission. In the latter application the method increases the robustness of the computer program in the face of unreliable transmission of the code from an instruction memory to a processor. In this case, the fault attack is not an intentional act by an attacker, but an unintentional fault occurring by chance.

In a practical embodiment of the method according to the invention, the further specific instruction is an unconditional jump or a conditional jump.

This method is particularly useful to protect jumps, since those are a likely attack points for a fault attack. For example, by attacking a jump, the attack may avoid jumping to a 'wrong-PIN-routine'. As a result, the system may operate as if a correct PIN has been entered.

In a practical embodiment of the method according to the invention, the further specific instruction is an instruction for at least fetching from, or writing to, a data memory.

By also using the invention in instructions for fetching data, the correct flow of the program is verified much more often. This makes it possible to detect a problem before a jump is executed.

For example, in the 8051 instruction set, the instruction 'MOV' can be used to fetch data from a memory to a register. The data fetching operation comprises an original address. A modified address is derived by processing, in accordance with the second mathematical function, the original address and a second value currently contained in the register. Next the data is fetched not from the original address but from the modified address.

Similarly, if an instruction operates on more than one address, for example, an instruction that copies data from one address to an other address, one or more of the addresses may be original addresses. The execution of the instruction that operates on more than one address may then use one or more modified addresses.

In a preferred embodiment of the method according to the invention, after the deriving of the modified address the method performs the following steps: verifying that the modified address is a valid address, and signaling if the modified address is not a valid address.

If the original address is not transformed into the modified address but into a wrong modified address as a result of a fault attack, the control flow of the program will be disturbed. As a result it may happen that an address is produced that is not a valid address, for example, because the address lies outside of the amount of available memory.

In one embodiment, a system using the method comprises a memory management unit (MMU) that implements virtual memory. As a result a large range of virtual addresses may be used. Typically, many virtual addresses are invalid. For example, an address may be invalid because it falls in a subrange of virtual memory which has not been registered with the MMU. If the modified address is such an invalid address a fault is detected.

A memory map need not be continuous, and may contain gaps. That is, an address may be invalid even though some address, of lower arithmetical value, is valid and some address of higher arithmetical value, is valid. The MMU can compare a modified address against a map, e.g. a list, of all valid addresses to decide if the modified address is valid or not.

In a preferred embodiment of the method according to the invention, the second mathematical function has a range that is a proper superset of the range of a program counter, which program counter is used for the execution of the computer program; and wherein the second mathematical function is configured such that the modified address lies outside the range of the program counter in case the original address is processed with a value, which is unequal to the second value.

To make detection more likely, the second mathematical function may be so configured that an address is produced that is illegal, in case of a fault attack. Having an illegal modified address has the advantage that jumping to it, or fetching from it, will fail.

If the range of the program counter is a subset of the range of the second mathematical function, the second mathematical function has the option of producing an invalid address.

The range of the program counter is the range of addresses to which a jump and/or data fetch can validly proceed.

A second mathematical function, with a range that is a proper superset of the range of a program counter, is advantageously combined with verifying that the modified address is a valid address and signaling in case this is not so. When the second mathematical function has been configured so that a fault attack gives rise to an invalid address, and if such an invalid address is detected, the fault attack can be dealt with forthwith instead of relying on the disturbed control flow.

Note that a modified address can be valid yet comprise more bits then used by the program counter. This situation happens, for example, if one or more of the most significant bits of the modified address are zero. Before the modified address is actually used, e.g., before it is sent over a bus, the unneeded zero bits may be discarded.

In a preferred embodiment the range of the second mathematical function runs from 0 up to, but not including, a power of two. The number of bits needed to express any number in the range of the second mathematical function is larger than the number of bits needed to express any number in the range of the program counter. That is, the smallest power of two that is larger than the highest value the program counter can attain, lies in the ranger of the second mathematical function.

This embodiment has the advantage that some bits used to express the range of the second mathematical function are always zero for valid addresses. This property makes it very undemanding to discover some invalid addresses, simply by verify that particular bits are not zero. An MMU is optional for this embodiment.

In a preferred method according to the invention, the first instruction in the specific basic block is stored in an instruction memory at a particular address, and wherein the start value depends on the particular address.

A possible weakness of the method is that a fault attack that diverts the execution of a basic block to a second basic block elsewhere in the memory, may not be detected if the second basic block comprises the same sequence of instructions. To avert this scenario the start value may be chosen in dependency on the particular address. If the basic block is copied elsewhere, the method will work with a wrong particular address, and hence produce a wrong modified address. Note that the encoding of address information as initialization of the register will make it harder to relocate code after the creation of an executable image.

In a practical embodiment of the method according to the invention, at least one of the first and the second mathematical functions comprises a hash function.

Preferably, the hash function is a secure hash function, for example a secure hash function as is known in the art of cryptography. Examples of secure hash functions include: sha-1, sha-256, ripemd-160, etc.

In case of a fault attack it is preferable that a wrong modified address bears little resemblance to the correct modified address. This will reduce the chances of an attacker somehow exploiting the disturbed control flow. A secure hash function is designed to have, among others, this property.

An important property of secure hash functions is that they are collision free. Preferably, the hash function is a collision free hash function. A function is collision free if it is exceedingly hard to produce two input values that produce the same output value. If the first mathematical function is collision free, then it is exceedingly hard to produce two different sequences of instructions that give rise to the same value in the register. For example, choosing the first mathematical function as counting the number of instruction is not collision free; any two sequences of instructions will give the same value in the register, as long as they have the same number of instructions.

The hash function can, in general, also be chosen, as a function that maps a large set of values, such as sequences of program instructions, to a small set of values, such as a single data word, in a substantially even manner.

If the first mathematical function is collision free, that attacker can not replace the instructions in the basic block with a different set of instructions, yet preserve the values in the register.

In a practical embodiment of the method according to the invention the deriving of the modified address comprises a linear combination of the original address and the second value.

If the second mathematical function is easy to compute, such as a linear combination, it is fast and easy to execute. This will reduce the complexity of the circuitry necessary to implement the method. Moreover, in general, a linear combination is also easy to invert, which makes it more practical to transform an ordinary program to one executable by the method according to the invention.

In a practical embodiment of the method according to the invention, the second mathematical function comprises an encryption or decryption using a secret key.

In an advanced fault attack, the attacker may be capable of introducing further faults during the computation of the modified address to correct for faults he/she introduced earlier in the basic block. His/her ability to do so depends on knowing what the correct modified address is and on knowing how his/her fault attacks will affect the calculation of the modified address. To obfuscate these matters from the view of the attacker an encryption of decryption may be used, such as, for example, given by a block cipher. Known block ciphers include, for example, DES and AES. The secret key can be stored in a suitable place in a device executing the method.

In a preferred embodiment of the method according to the invention the start value is retrieved from a tamper resistant device.

Retrieving from a tamper resistant device gives the possibility to bind the software to hardware that comprises the tamper resistant device. A tamper resistant device is a device that resists unauthorized reading of its content and/or unauthorized writing to it.

A tamper resistant device could, for example, be embodied as a tamper resistant memory, a Trusted Platform Module (TPM), as a smart card, as a SIM card, etc.

The tamper resistant device could also be embodied as a processor. The tamper resistant device could also be embodied as storage device, such as a memory or a disk partition, with associated access software, running on a processor.

This embodiment is advantageous if the invention is used together with a system for copy protection, or digital rights management. For example, suppose a person obtains an illegal copy of a software program, which is prepared to be executed using the invention with a particular start value. As the copy was intended for different hardware, the start value that is needed for executing the software is different from the start value comprised in the person's hardware. As a result the person cannot run the illegal copy.

To make the illegal copy run, the person needs to change the value in his tamper resistant memory. If the tamper resistant memory resists unauthorized writing, this is impossible. Even if the tamper resistant memory allows unauthorized writing, but resists unauthorized reading, the person cannot find the start value that should be used with the illegal copy.

The computer architecture according to the invention comprises a processor operative to execute a computer program; the computer architecture comprises a means for executing the method according to the invention.

The device according to the invention is provided with the computer architecture according to the invention; wherein the device comprises any one of a smart card, a set-top box, a mobile phone and a personal digital assistant.

The computer program product comprises computer code for implementing the method according to the invention.

The further method for adapting a computer program according to the invention is a method for adapting a computer program for execution using the method according to the invention. The further method comprises the steps of: identifying within the computer program a basic block comprising a first number of instructions; identifying, within the basic block, a further specific instruction comprising a first address; processing, in accordance with a first mathematical function, a start value and a representation of all instructions in the basic block up to and/or including the further specific instruction comprising the first address in order to derive a second value; determining an original address, such that processing, in accordance with a second mathematical function, the second value and the original address, produces the first address; modifying the specific instruction by replacing the first address by the original address (510).

It is particularly convenient to first create a program that is capable of being executed on an ordinary computer, and next transforming the program by using the further method according to the invention. In order to achieve this, all instructions that will be handled as a further specific instruction by the method according to the invention need to be modified. This transformation may be done by a compiler, an assembler, linker, or a specialized piece of software.

Alternatively, it can also be convenient to first create relocatable object code, using regular tools, such as a compiler. Relocatable object code does not yet contain fixed addresses but rather, contains symbolic references to locations defined within the object code as well as symbolic references to locations defined outside the object code. Before the relocatable object code is used the symbolic references are replaced with actual addresses. During the replacement with actual addresses the invention may be applied. The replacement may be conveniently carried out by linker or a loader.

The further computer program product according to the invention comprises computer code for implementing the further method according to the invention.

The computer program product and the further computer program product can be embodied using, among others: a storage unit comprising the computer program, a server comprising the computer program. The computer code can be fabricated using various well known high-level programming languages, such as, C, C++ or Pascal. The computer code can alternatively, be fabricated using low-level programming languages, such as assembly, machine codes or microcode.

Therefore, a computer architecture and a method for adapting and executing a computer program is provided. A value is computed by processing instructions comprised in a basic block of the program in accordance with a first mathematical function. An instruction comprising an original address is modified, using a second mathematical function taking the value as input, to comprise a modified address. In this manner, a fault attack during execution of the computer program will cause a disturbance of the control flow, thereby making such an attack unlikely to succeed.

BRIEF DESCRIPTION OF THE DRAWINGS

The invention is explained in further detail by way of example and with reference to the accompanying drawings, wherein:

FIG. 6 is a table illustrating a worked example of the invention in operation.

Throughout the Figures, similar or corresponding features are indicated by same reference numerals.

Figure 1:
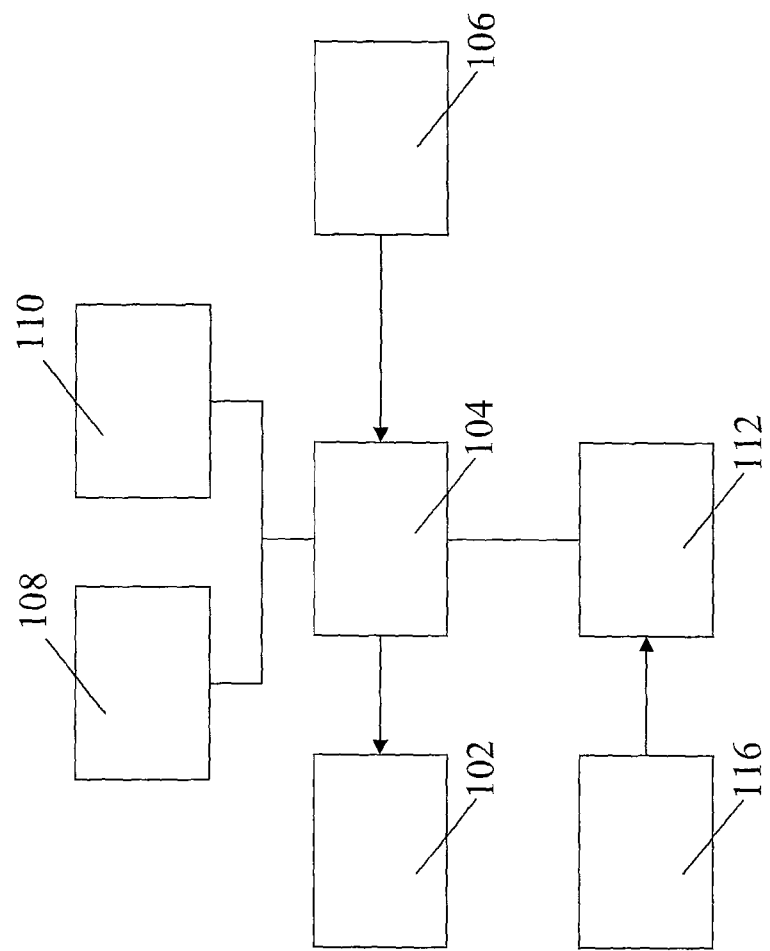
FIG. 1 is a block diagram showing a computer architecture according to the invention.

LIST OF REFERENCE NUMERALS 100 a computer architecture
102 a processor
104 a means for executing the method according to the invention
106 an instruction memory
108 a means for executing a first mathematical function
110 a means for executing a second mathematical function
112 a register
114 a device, such as a smart card
116 a start value
200 a first embodiment of the method
202 at the start of an execution of a specific one of the basic blocks
204 storing a start value in a register
206 retrieving an instruction from a memory
208 processing, in accordance with a first mathematical function
210 storing the updated value in the register
212 executing the specific instruction
214 deriving a modified address by processing, in accordance with a second mathematical function 216 modifying the further specific instruction
218 executing the further specific instruction
220 deciding if an instruction comprises an original address
300 a second embodiment of the method
400 a third embodiment of the method
402 verifying that the modified address is a valid address
404 signaling if the modified address is not a valid address.
500 a first embodiment of the further method
502 identifying a basic block comprising a first number of instructions, within the computer program
504 identifying a further specific instruction comprising a first address, within the basic block
506 processing, in accordance with a first mathematical function, a start value and a representation of all instructions in the basic block up to and/or including the further specific instruction comprising the first address in order to derive a second value
508 determining an original address, such that processing, in accordance with a second mathematical function, the second value and the original address, produces the first address
510 modifying the specific instruction comprising the first address to comprise the original address instead of the first address
601 a column with addresses
602 a column with instructions corresponding to the addresses
603 a column with values in register 112
604 a formula illustrating a second function

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In FIG. 1, a computer architecture (100) according to the invention is illustrated in a block diagram. The computer architecture (100) comprises a processor (102) receiving instructions from a means for executing the method according to the invention (104). The means (104) receives instruction from an instruction memory (106). The means (104) is connected to a means for executing a first mathematical function (108) and a means for executing a second mathematical function (110). The means (104) is connected with a register (112).

The computer architecture (100) can be embodied in a device, such as a smart card (114).

During operation, at the start of a basic block, register (112) is loaded with start value (116). Start value (116) may be stored in a memory, or be dynamically computed, for example based on the address. The means (104) receives an instruction from the memory (106). The means (104) executes the method according to the invention, for example, in a manner as explicated in embodiments below. For each instruction not comprising an original address, or at least for some such instructions, the means (104) updates the register (112) using the means (108). After receiving a further specific instruction comprising an original address, or at least for some such, the means (104) uses the means (110) to process a representation of the further specific instruction together with the value currently in the register (112). The means (104) then modifies the further specific instruction.

Substantially all instructions that are routed through the means (104) are eventually forwarded to the processor (102), where they are executed.

Note that the computer architecture (100) can be extended with various components and peripherals, such as are known to a person skilled in the art. For example, the architecture (100) may comprise a memory management unit, responsible for routing data to and from the memory (106). For example, the architecture (100) may comprise a data memory for storing data upon which the instructions can act. Note that data memory and instruction memory can be combined into a single physical memory.

The processor (102) can be a computer processor, such as 8051 processor, a MIPS processor or a Pentium. The processor (102) can also be a dedicated data processor or signal processor, such as used in mobile phones.

The means (104), (108) and (110) can be made using dedicated hardware, such as electronic circuits that are configured for implementing their respective functionalities for use according to the invention. They can also be made from generic hardware that is controlled using software in operational use, or they may comprise a combination of dedicated hardware, generic hardware and dedicated software to implement the architecture (100).

The memory used, such as in memory (106) or the register (112) can be made from RAM memory, such a DRAM, SRAM or SDRAM, or from flash-memory, magnetic storage, such as a hard disk, or optical storage, or any other kind of suitable storage. Optionally, memory (106) may be ROM memory.

The architecture (100) has the advantage that it can modify instructions on the way from the memory (106) to the processor (102). In this way, the method is transparent to the processor (102). In other words, it seems, to the processor (102) as if it is executing a regular program. In this way, the impact of using the method on a computer architecture (100) is minimized.

The invention makes the address finally used in the further specific instruction dependent on instructions, of which it can be proven that they must have preceded the further specific instruction. As a result, if the execution that in reality took place, diverges from the execution that should have taken place, based on a prior analysis of the program in basic blocks, the modified address is wrong. As a result the execution will diverge in a potentially unpredictable manner. This makes it very hard for an attacker to anticipate the effects his modifications, i.e. his attacks, will have on the hardware. In this way, the invention makes a significant contribution to the art of preventing fault attacks, and mitigating the results of such attacks.

Note that in an alternative embodiment, the means (104), (108), (110) and register (112) are comprised in other components of the architecture (100). For example, they may be comprised in processor (102) or in a memory management unit (not shown). Also, means (108), (110) and (112) may be comprised in means (104). Also processor (102) may have a direct connection to memory (106).

Figure 2:
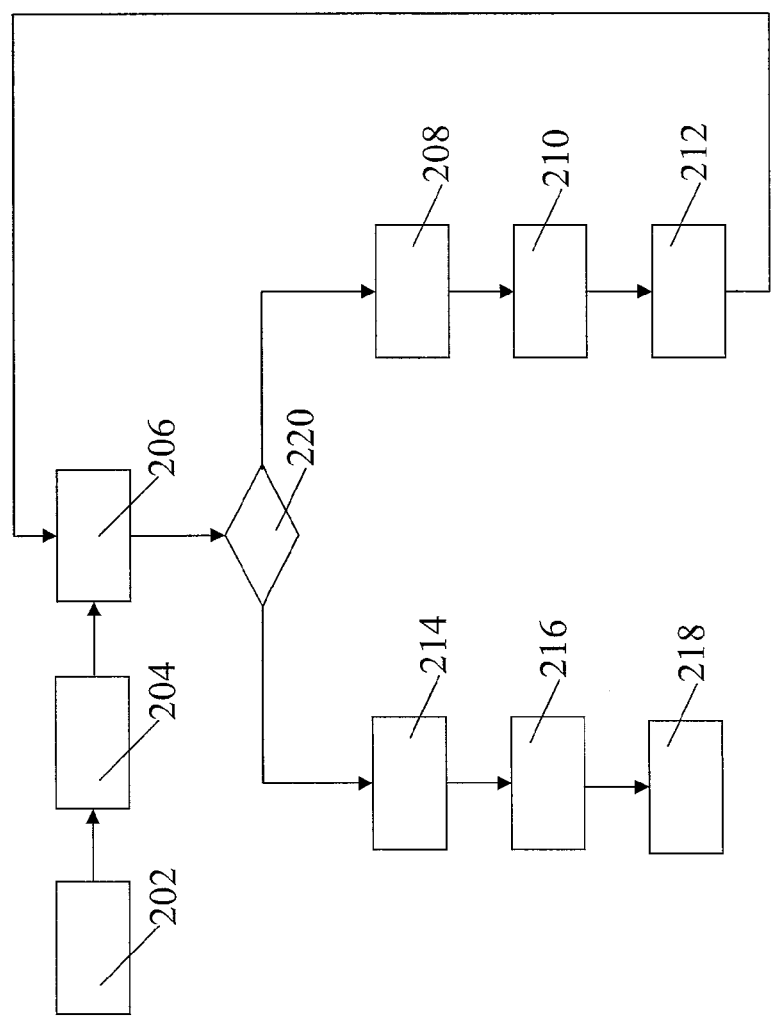
FIG. 2 is a flow chart illustrating a first embodiment of the method according to the invention.

In FIG. 2 a flowchart is shown illustrating a first embodiment (200) of the method according to the invention.

The method can commence, at the start of an execution of a specific one of the basic blocks, which step is illustrated at (202). At that point, a start value is stored (204) in a register. Next this embodiment commences with retrieving (206) an instruction from a memory. It is then decided if the instruction comprises an original address, or not in a step (220).

In case it is decided at step (220) that the instruction does not comprise an original address, then this embodiment proceeds with the step indicated by reference sign (208). In step (208) this embodiment processes, in accordance with a first mathematical function (208), a first value currently contained in the register (112) together with a representation of the specific instruction in order to derive an updated value.

After step (208), the updated value is stored (210) in the register. At this point the specific instruction can be executed (212). Note that an instruction, not comprising an original address, is typically not modified before execution. Execution typically takes place by a processor (102).

After the specific instruction is executed (212), this embodiment proceeds with retrieving a next instruction (206).

In case it is decided at step (220) that the instruction does comprise an original address, then this embodiment proceeds with the step indicated by reference sign (214). Such an instruction, comprising an original address, is a further specific instruction. Examples of instructions including an original address are: conditional, absolute and relative jumps and data fetches, etc.

In step (214) a modified address is derived by processing, in accordance with a second mathematical function, the original address and a second value currently contained in the register. Next, the further specific instruction is modified (216) to use the modified address instead of the original address. Next, the modified further specific instruction is executed (218).

If the further specific instruction is an absolute jump this marks the end of the basic block. At that point the method may commence again at step (202). However, if the further specific instruction is, e.g., a data fetch, the method should continue to retrieve the next instruction, using step (206).

The invention can be applied to basic blocks, but may also be applied to, so-called, super blocks. A basic block has a single entry point and a single exit point. A super block has a single-entry point, but may have multiple-exit points. A super block comprises one or more basic blocks.

For example, if the further specific instruction is a conditional jump, and the condition is not fulfilled, i.e. the jump is not taken, and the instruction following the conditional jump is not the target of any jump, conditional or otherwise, then an embodiment has the option of continuing at step (202) or (206). For convenience, the method may decide that a basic block will always end at a conditional jump. On the other hand, this is not strictly necessary. Note that, however this implementation detail is decided, a further method for adapting a computer program for execution using the method of claim 1, should be embodied using the same definition of basic block as the embodiment of the method according to the invention, with which it may be used.

In step (202) there may be a determination if this is the beginning of a basic block. There are several ways to accomplish this. For example, the code may include a special marker, e.g., a special instruction that marks the beginning of a basic block. The code may include, for example, the storing of the start value in the register (112) as software instructions, i.e. part of the method may be executed in the software being protected itself. As a further example, the means (106) may have a list of starting points of basic blocks, provided to it, at some earlier point. Before executing of a computer program, the means (106) may perform a static analysis in basic blocks.

A representation of the instruction is, for example, the numerical representation of the instruction, e.g., the so called opcode. In case the opcode has an inconvenient size, such as not being a multiple of 8 bits, the opcode may be padded. For example, the opcode may be padded with a number of 0-valued bits, as is convenient. A representation of the instruction can also restrict itself simply to the class of the instruction, e.g., "0" for logical operations, "1" for data fetches, "2" for other instructions.

If the instruction contains one or more fixed parameters, i.e. parameters that do not depend on inputs given to the software, but rather are determined and fixed at compile time, then the parameters may also be included in the representation of the instruction. For example, an instruction storing a fixed number to a fixed address may be represented completely. For example, an instruction for storing a user-provided number at a dynamic place in memory, may be represented as 'instruction for storing a number at an address', without reference to the particular number or address. What is important, is that any execution of the basic block will eventually give the same second value.

The first mathematical function takes as input, at least, the first value and the representation of the specific instruction. One convenient way to achieve this, is to first concatenate the first value with the representation of the specific instruction, and use the concatenation as a single input for the first mathematical function.

The second mathematical function takes as input, at least, the second value and the original address. One convenient way to achieve this, is to first concatenate the second value with the original address, and use the concatenation as a single input for the second mathematical function.

Preferably the first mathematical function comprises a secure hash function. A secure hash function has the property that the relationship between the input values and the output values is obfuscated in a manner which is particularly complicated.

Preferably the second mathematical function comprises an encryption or decryption using a secret key. An encryption or decryption has the property that the relationship between the input values and the output values is obfuscated in a manner which is particularly complicated, whereas the function remains easily reversible. An encryption can be reversed by using the corresponding decryption using the same key. Preferably the secret key is stored in a secure manner which is inaccessible to an attacker. This is, however, not strictly necessary. Even if the secret key is known to the attacker, the relationship between the input to an encryption and the output of the encryption will be very complicated.

A practical choice for the second mathematical function is a linear combination of the original address and the second value. For example, the second mathematical function may be the sum of the original address and the second value.

A practical choice for the first mathematical function is to sum numerical representations of the specific instructions.

The start value can be a fixed number, such as zero. The start value may also be chosen indepency on other factors, in order to further hinder the attacker. For example, the start value may depend on a reference number for the basic block. Or, in case the first instruction in the specific basic block is stored in an instruction memory (106) at a particular address, the start value may depend on the particular address.

The order of the steps can be varied or some steps may be executed in parallel, as will be apparent to a person skilled in the art. For example, storing (210) the updated value in the register and executing the specific instruction (212) may be executed in parallel or step (212) may be performed before step (210).

Between the steps of the method other operations can be interposed. For example, the method according to the invention may be combined with other countermeasures against fault attacks.

Note that the method can be repeated, for multiple basic blocks, specific instructions and/or further specific instructions.

Figure 3:
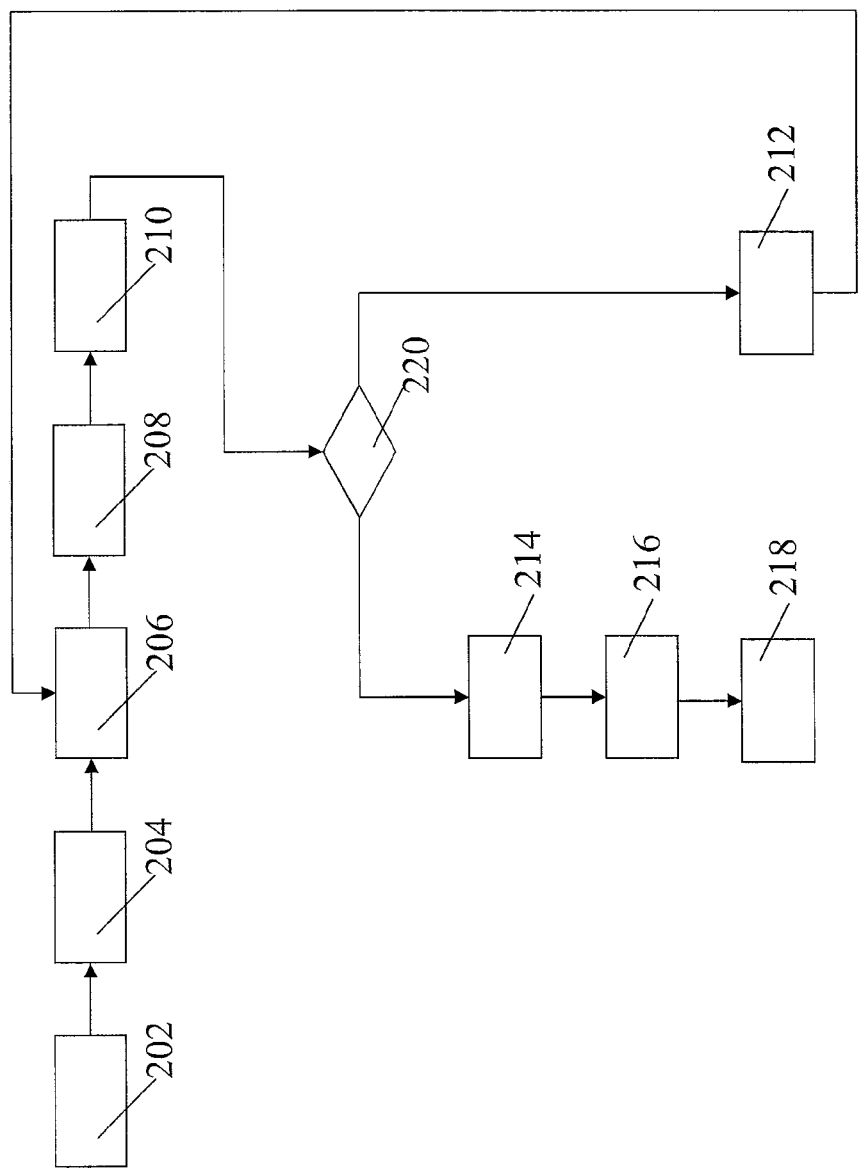
FIG. 3 is a flow chart illustrating a second embodiment of the method according to the invention.

In FIG. 3 a flowchart is shown illustrating a second embodiment (300) of the method according to the invention.

This embodiment uses the same steps as in the first embodiment, but in a slightly different order.

After retrieving (206) an instruction from a memory, for any specific instruction in the specific basic block, independent if the specific instruction comprises an original address or not, the steps (208), (210) are executed. Only then is it decided (220) if the specific instruction comprises an original address. If so, the steps (214), (216) and (218) are executed. If not, the step (212) is executed. After step (212) this embodiments proceeds with retrieving the next instruction (206). After step (218), the embodiment may proceed at step (202) or (206), depending on whether the basic block is finished or not.

This embodiment has the advantage that a fault attack will be detected that modifies, e.g., a conditional jump into an absolute jump.

Moreover, the steps (208) and (210) may be executed in parallel with step (220). This will speed up the method.

Figure 4:
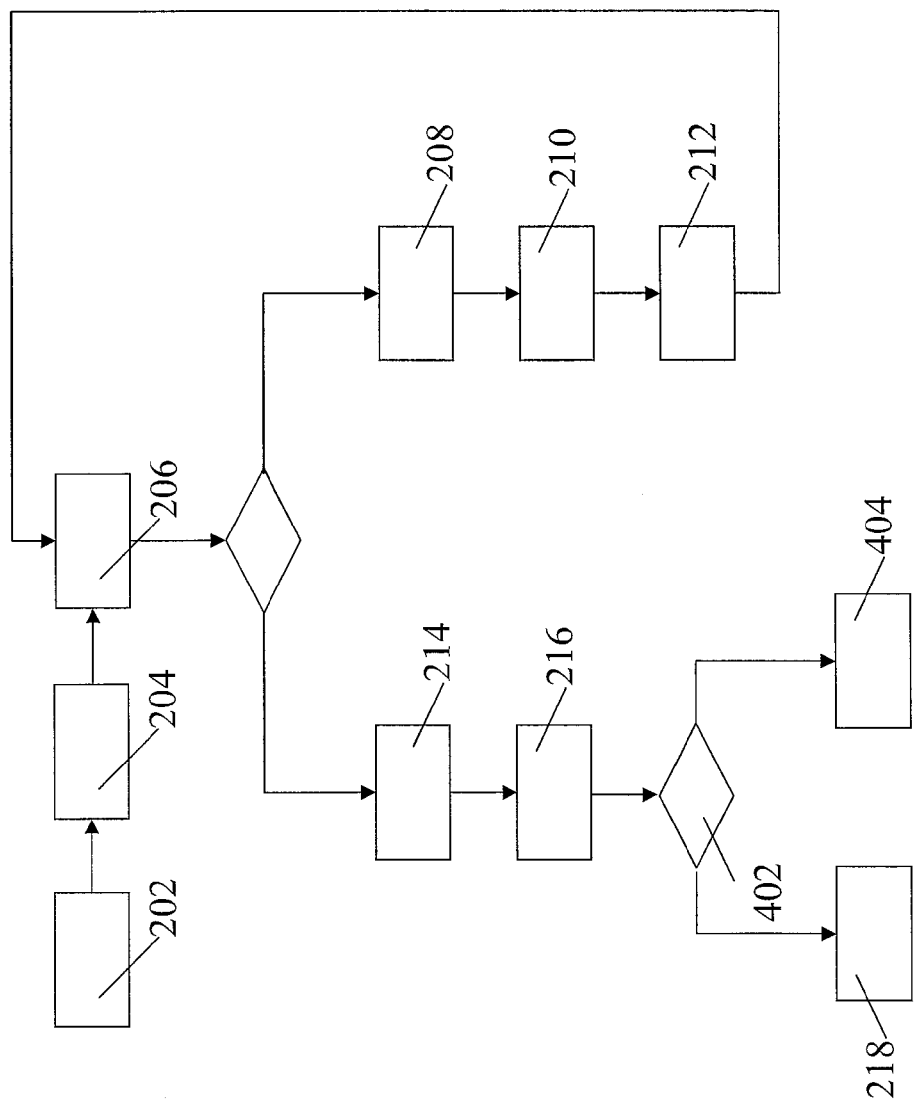
FIG. 4 is a flow chart illustrating a third embodiment of the method according to the invention.

In FIG. 4 a flowchart is shown illustrating a third embodiment (400) of the method according to the invention.

This embodiment uses the same steps as in the first embodiment, but has some additional steps. After deriving the modified address (214), this embodiment verifies that the modified address is a valid address (402).

In case it is found that the modified address is not a valid address, this is signaled (404). In case it is found that the modified address is a valid address, the further specific instruction is executed (218).

In case of a fault attack, a wrong modified address may be derived. That is, the value is not as was originally intended, and the execution of the program is disturbed. In case the modified address comes out so wrong, that the wrong modified address is not even a valid address, it is possible to take corrective measures. In that situation it is clear that something is wrong.

Corrective actions, taken in response to the signaling, can include: logging the event, terminating the application, shutting down the system (100), initiating a self-destruct sequence, blanking one or more memories, blanking and/or destroying one or more fuses, restarting the application, rebooting the system (100), repeating execution of the basic block that caused the signaling.

It is possible to combine the detecting of an illegal address with memory management units, such as known in the art. For example, a modified address may be a virtual address that is forwarded to a memory management unit (MMU). The MMU either translates the modified address into a physical address, or observes that the modified address is an invalid modified address.

In an architecture (100) instructions are fetched from an address that is indicated by the program counter. To make it more likely that a fault attack will result in an invalid address, the second mathematical function has a range that is a proper superset of the range of a program counter.

The second mathematical function is then configured such that the modified address lies outside the range of the program counter if the original address is processed with a value that is unequal to the second value.

This effect may, for example, be achieved as follows. Suppose, for example, that the program counter has a range of 16 bits. That is, valid addresses are expressed using at most 16 bits. The second mathematical function is computed by taking the 32 most significant bits of an encryption of the sum of the original address and the second value.

In case a fault attack occurs, any value in the 32 bit output of the second mathematical function is equally likely. The probability of producing an illegal address is $(2^{32}-2^{16})/2^{32}=1-2^{(-16)}$. The latter probability is, for most applications, negligibly close to unity. That is, substantially always, an invalid address will be produced. Negligibly close to unity should be judged with respect to the amount of effort an attacker has to invest to perform the attack in a potentially successful manner, compared to the gain he would have if the attack were to succeed.

To further the chances of producing a modified address which is illegal in case of a fault attack, the first mathematical function may also have a larger range than the program counter.

Figure 5:
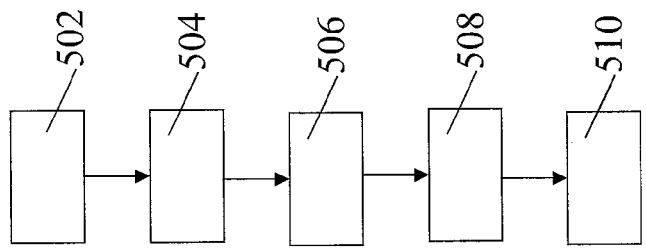
FIG. 5 is a flow chart illustrating an embodiment of the further method according to the invention.

In FIG. 5 a flowchart is shown illustrating an embodiment (500) of the further method according to the invention.

The further method can be used to adapt a computer program for execution, the execution being according to the method of claim 1.

The embodiment commences with identifying a basic block comprising a first number of instructions, within the computer program (502). Within the basic block a further specific instruction is identified (504) comprising a first address. Next, a start value and a representation of all instructions in the basic block up to and/or including the further specific instruction comprising the first address in order are processed, in accordance with a first mathematical function, to derive a second value (506). In step (506) the instructions in the basic block are processed in the same manner as they would be in the method according to the invention.

Next, the embodiment determines an original address, such that processing the second value and the original address, in accordance with a second mathematical function, produces the first address (508). Finally, the embodiment modifies the specific instruction comprising the first address to comprise the original address instead of the first address (510).

The further method may be repeated to handle a next basic block. The method may be preceded with a static analysis of the computer program, in order to determine the location of any or all basic blocks.

Step (506) follows in essence the same steps as an embodiment of the method according to the invention would follow, up to the moment at which the second value is used. The further method needs the second value in order to determine what original address to put into the further specific instruction.

It is convenient to choose a second mathematical function which has an inverse second mathematical function. The inverse second mathematical function takes as input the value and the first address and produces an outcome. The inverse second mathematical function has the property that, the second mathematical function applied to the value and the outcome produces the first address.

The original address can be computed by applying the inverse second mathematical function to the combination of the value and the first address.

For example, the second mathematical function is the sum of the original address and the second value. The original address can then be computed as the first address minus the second value. Note, for subtractions and for additions, two's complement arithmetic may be used.

For example, the second mathematical function is an encryption of the sum of the original address and the second value. The original address can then be computed by decrypting the first address and subtracting the second value.

In a further embodiment of a computer architecture (100) according to the invention a processor (102) is extended with a register. This register is referred to as the instruction hash register (IHR).

As a next element, this embodiment uses an incremental, collision resistant hash that assigns a unique number to a sequence of representations of instructions and/or operations.

This register contains the incremental hash, over the instructions since the last jump taken. This register is part of the save state of the processor (102) and its content can only be used by jump instructions. Note that, in case of an interrupt or an exception, the register is saved, and later retrieved, preferably on a stack. The width of the register is larger than the program counter width, measured in bits. Furthermore, the architecture (100) is configured such that from the offset or absolute address of the jump instruction, i.e. the original address, and the incremental hash value of the preceding non-jump instructions of the basic block the target address of the jump, i.e. the modified address, can be determined.

The IHR provides evidence of tampered execution. The hash function is chosen in such a way that its result contains significantly more bits than the program counter (PC) has. Evidence of a tampering is then found in the bits that overshoot the PC. In case of an un-tampered execution of a basic block b, the IHR contains hashvalue(b) and the bits in the result of IHR−(hashvalue(b)−offset), i.e. the second mathematical function, which have no equivalent position in the PC, are zero.

In case of a tampered execution, due to the good characteristics of the incremental hash function over the instructions of the basic block b', wherein b' is the tampered version of b, the incremental hash-value over b will be unequal to the hash over b'. This is, likely, reflected in the bits that overshoot the PC, i.e. one or more of these is/are non-zero.

In the unlikely case that the tampering is only reflected in an incorrect target address, it is very unlikely that the computed target is an entry point of a basic block. Skipping a start of the next basic block is again like tampering of that block, and will there activate the security mechanism again. In that case the tampering will be detected during a later jump.

This embodiment comprises a compute engine, e.g., processor (102), extended by the instruction hash register and a mechanism that updates this register according to the sequence of executed instructions and the chosen incremental hash function.

Prior to using this embodiment for the execution of a computer program, use can be made of a compiler or binary manipulation tool that re-places the target addresses of jump instructions according to the chosen incremental hash function and functional composition.

For example, suppose this embodiment uses subtraction as functional composition, i.e. as second mathematical function, to determine the target of a jump instruction. To generate correct code for this architecture (100), the compiler has to compute the incremental hash-value of the preceding instructions of the basic block in order to determine the correct target address to be issued.

Let the incremental hash of a basic block b be denoted by hashvalue(b). For encoding a jump relative to the program counter (PC) with an offset o, the compiler would issue the target address ta=hashvalue(b)−o. The target address is recorded in the computer program, and read, later on, as the original address. The compute engine will compute the effective target eta address through the calculation eta=PC+(IHR−ta) resulting in a correct jump only if all the instructions of the basic blocks have been executed prior to the jump instruction. If one or more instructions have been skipped, the statically computed value hashvalue(b), and the contents of the IHR will not match and will lead to evidence of the tampering.

The subtraction function that composes the hash-value computed by the compiler and the offset or absolute address can be improved in terms of security. Just by adding values to the result of the subtraction, the processor (102) can be directed to new targets. This can be repaired by choosing an encryption of these values based on a secret key within the processor (102). For example, the modified address can be obtained as $E_{f(key, address)}$(hashvalue−offset), i.e. as an encryption with a key that depends on a further key and an address and which encryption takes as input the value of the hash-value, i.e. the second value, minus the offset. The offset is the offset used in a relative jump. Note, that the method is also applicable to absolute jumps by taking the offset to be the absolute address.

Instead of an encryption or decryption also a, so-called, trapdoor function can be used. A trapdoor function is a function that is easy to compute, yet the inverse of the trapdoor function is hard to compute. Moreover, the trapdoor has a secret such that the inverse of the trapdoor is easy to compute for someone who knows the secret of the trapdoor. For example, let T be a trapdoor function. The second mathematical function can be taken as T(hashvalue−offset). For the attacker this will make it uncontrollable what modified address will be derived. To compute the necessary offset, one needs to know the secret of the trapdoor.

In a further improvement the incremental hash over the instructions of a basic block can be made address-aware. The address-awareness can be implemented by means of encoding into the initial value of the incremental hash register the address information regarding where the basic block is stored in a memory, and initializing the IHR to the address encoding of the target address as a side effect of jump operations. Note, the encoding of address information as initialization of the IHR will make it impossible to relocate code after the creation of an executable image. This protects against an attack where an entire basic block is moved to a different address, or is replaced by a different basic block coming from another location.

In FIG. 6 a table is given illustrating a worked example of the invention in operation.

Column 601 lists a number of addresses. At the addresses indicated in column 601, the instructions give in column 602 are stored. The instructions taken together are a basic block. That is, there is some other instruction (not shown in FIG. 6) that may jump to address 1, and the final instruction 3 exits the basic block. The instruction at address 3 is a jump instruction.

We assume in this example that addresses can be expressed using 16 bits. That is, program counter has a range that can be expressed using 16 bits. That is, the smallest power of two that is larger than the highest value the program counter can attain, is 2^16.

Column 603 lists the value of register 112 during execution. Before the execution of the basic block is started, the register is loaded with a start value. In this example the register receives the value 0xaaaaffff. Note that number starting with 0x are hexadecimal numbers. For example, the first function may be a hash function.

After the instruction 1, CMP, is read, the value in the register is updated using the first function. In this situation the new value of the register is 0x3b538d9e.

After the instruction 2, AND, is read, the value in the register is updated using the first function. In this situation the new value of the register is 0xab371234.

After the instruction 3, JMP is read, it is observed that is a jump instruction. The jump instruction contains an offset. In this case the offset is 0xab371232. Next the offset is combined with the contents of the register 112, using the second function. In this case the second function is the, so-called, exclusive or (XOR) function. The computation that is done is given in formula 604. The result is 0x00000006

Next, it is observed that the first 16 bits, i.e. the 16 most significant bits, i.e. the first 4 hexadecimal digits, of the result are 0. If any of these 4 digits were not 0 it could be concluded that a fault attack had taken place, since the device does not use addresses using more than 16 bits.

Next, the jump is executed. The jump will go to address 0x0006. Note that the first 16 zero bits are discarded before the jump is executed.

If a fault attack had taken place, during execution of this basic block the value in the register changes. For example, if the AND instruction were changed into a NOP instruction, the register would not have taken the value 0xab371234, but some other value. As a result the calculation in formula 604 would give a different result. Likely the different result would not start with 16 zero bits, in which case the fault attack would be spotted. Even if the first 16 bits were zero, the 16 least significant bits would likely be unequal to the 0x0006, in which case the jump would be executed to the wrong address.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, Application Specific Integrated Circuits (ASICs) and/or dedicated hard wired logic may be used to construct alternative equivalent embodiments of the present invention. In a claim enumerating several means, several of these means may be embodied by one and the same item of hardware Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The invention claimed is:

1. A method of executing a computer program in a memory, the method comprising:
    storing a start value in a register at the time of an execution of a specific basic block;
    retrieving an instruction from the memory;
    if the instruction does not comprise an original memory address, executing additional steps comprising:
        processing, by a first mathematical function, the start value in the register and a representation of the instruction from the memory to generate a new value;
        storing the new value in the register; and
        executing the instruction;
    if the instruction comprises an original memory address, executing additional steps comprising:
        processing, by a second mathematical function, the start value in the register and the original memory address to generate a modified address;
        modifying the instruction to use the modified address; and
        executing the instruction.

2. A method as in claim 1, wherein the instruction is a jump or a conditional jump.

3. A method as in claim 1, wherein the instruction is for at least fetching from or writing to a data from a data memory.

4. A method as in claim 1, wherein after generating the modified address the following are performed:
    verifying that the modified address is a valid address, and signaling if the modified address is not a valid address.

5. A method as in claim 1, wherein the second mathematical function has a range that is a proper superset of the range of a program counter, which program counter is used for the execution of the computer program; and wherein the second mathematical function is configured such that the modified address lies outside the range of the program counter in case the original memory address is processed with a value that is unequal to the second value.

6. A method as in claim 1, wherein the first instruction in the specific basic block is stored in an instruction memory at a particular address, and wherein the start value depends on the particular address.

7. A method as in claim 1, wherein at least one of the first and the second mathematical functions comprises a hash function.

8. A method as in claim 1, wherein generating the modified address comprises a linear combination of the original memory address and the start value.

9. A method as in claim 1, wherein the second mathematical function comprises an encryption or decryption using a secret key.

10. A method as in claim 1, wherein the start value is retrieved from a tamper resistant device.

11. A device comprising a processor, a memory management unit, and data memory operative to execute the method defined in claim 1.

12. A device according to claim 11; wherein the device comprises at least one of:
    a smart card,
    a set-top box,
    a mobile phone and
    a personal digital assistant.

13. A non-transitory computer-readable storage medium containing instructions for implementing the method as defined in claim 1.

14. A further method for adapting a computer program for execution using the method of claim 1, comprising:
- identifying, within the computer program, a basic block comprising a first number of instructions;
- identifying, within the basic block, a further specific instruction comprising a first address;
- processing, in accordance with a first mathematical function, a start value and a representation of all instructions in the basic block up to and/or including the further specific instruction comprising the first address in order to derive a second value;
- determining an original memory address, such that processing, in accordance with a second mathematical function, the second value and the original memory address, produces the first address; and
- modifying the specific instruction by replacing the first address by the original memory address.

15. A further non-transitory computer-readable storage medium containing instructions for implementing the further method as defined in claim 14.

16. A device comprising:
- a processor;
- a memory management unit; and
- data memory storing instructions, which when executed by the processor, perform a method of:
  - storing a start value in a register at the time of an execution of a specific basic block;
  - retrieving an instruction from the memory;
  - if the instruction does not comprise an original memory address, executing additional steps comprising:
    - processing, by a first mathematical function, the start value in the register and a representation of the instruction from the memory to generate a new value;
    - storing the new value in the register; and
    - executing the instruction;
  - if the instruction comprises an original memory address, executing additional steps comprising:
    - processing, by a second mathematical function, the start value in the register and the original memory address to generate a modified address;
    - modifying the instruction to use the modified address; and
    - executing the instruction.

17. A device according to claim 16, wherein the device comprises at least one of:
- a smart card;
- a set-top box;
- a mobile phone; and
- a personal digital assistant.

* * * * *